S. Vansyckel,
Furnace-Grate Bar.
N° 9,958.  Patented Aug. 23, 1853.
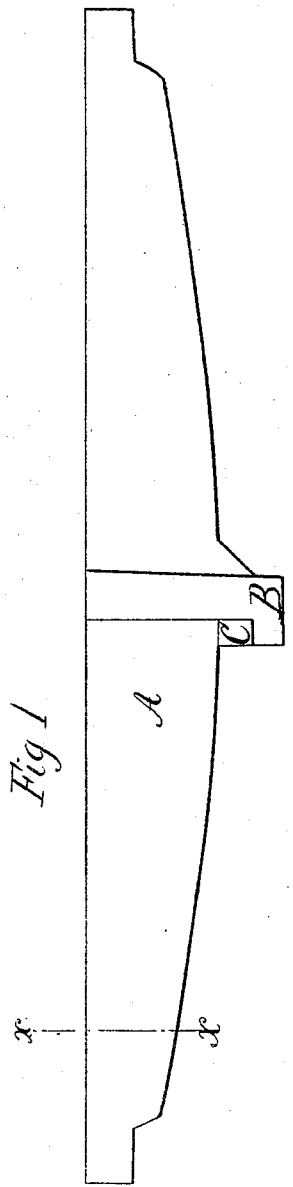
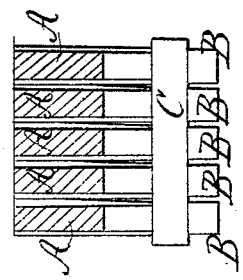

UNITED STATES PATENT OFFICE.

SAMUEL VANSYCKEL, OF LITTLE YORK, NEW JERSEY.

GRATE-BAR.

Specification of Letters Patent No. 9,958, dated August 23, 1853.

*To all whom it may concern:*

Be it known that I, SAMUEL VANSYCKEL, of Little York, in the county of Hunterdon and State of New Jersey, have invented certain new and useful Improvements in Grate-Bars and the Manner of Preventing Them from Warping or Twisting by the Heat, and that the following is a full, clear, and exact description of the same, reference being had to the accompanying drawing, making a part thereof, and which represents a perspective view of several of the bars in place and secured by my method.

The nature of my invention consists in casting, or otherwise securing, to the under sides of grate bars, hooks or catches, through which series of hooks or catches, a rod or bar is passed and held, and by which the grate bars are prevented from warping or twisting by the heat, or from falling down if one end should slip off.

To enable others skilled in the art to make and use my invention, I will proceed to describe the same with reference to the drawings.

A, represents the grate bars, each having a hook or catch B, either cast or otherwise secured to it, through which series of hooks or catches, when the grate bars are in proper position is passed the rod or bar C, for the purpose of preventing the grate bars from twisting or warping by the heat.

The advantages to be derived from this mode over that, of grate bars cast in sections with permanent braces between them, are, first, that a bar if broken or otherwise injured may be removed, or replaced by a new one. Second, the spaces between the grate bars for the draft may be varied, by shifting the bars, on the holding rod or bar C, it being so formed as to fit the hooks on any part of it. Third, entirely avoiding the necessity of closing up any part of the draft space between the grate bars, and allowing the fire to be punched or raked the whole length of the grate bars. By the use of separate bars, with my mode of holding them down, the tendency to warp is diminished, for the ends of the grate bars are uncontrolled and free to expand by the heat in any direction, while the centers of the said bars are always held firmly by the rod or bar C.

The hooks or catches B, may be made square, round or angular, and the rod or bar C, around or underneath which they pass, should be of a corresponding shape, and the hooks may project sufficiently far below the bottom of the grate bars, to prevent them or the rod from being acted upon by the extreme heat which the grate bars themselves must sustain. A fastening is not found necessary between the hook and rod, as the difference of expansion of the metals by the heat of one, and the draft on the other holds them sufficiently firm for all practical purposes. But if found necessary, keys, wedges or equivalent fastenings may be used.

If the grate bars are to be very long, two or more of these sets of rods and hooks may be found necessary. The action of the rods is to hold down the grate bars, whose tendency is to warp or twist in the opposite or upward direction; and they also prevent the grate bars from dropping down, if one end should slip or be drawn off from its end support.

Grate bars constructed upon the above plan, have been thoroughly and practically tested, with a result almost surprising, actually enduring the test, for twice the length of time of that of any other grate bars of which I have knowledge.

Having thus fully described the nature of my invention what I claim therein as new and desire to secure by Letters Patent is—

Forming a hook or catch upon the underside of the grate bars, and passing through or over said hooks or catches a holding bar, to prevent twisting and warping, substantially as described.

SAML. VANSYCKEL.

Witnesses:
  H. F. VAN NORTWICK,
  WM. VOORHIES.